United States Patent [19]

Eavenson, Sr. et al.

[11] Patent Number: 5,516,180
[45] Date of Patent: May 14, 1996

[54] PROP AND LATCH ROD FOR A VEHICLE SEAT

[75] Inventors: Jimmy N. Eavenson, Sr., Juneau; Stanley J. De Braal, West Bend; David G. Krueger, Beaver Dam, all of Wis.

[73] Assignee: Deere & Company, Moline, Ill.

[21] Appl. No.: 167,373

[22] Filed: Dec. 15, 1993

[51] Int. Cl.⁶ .................................................... B60N 2/10
[52] U.S. Cl. ......................... 296/68.1; 296/19; 296/65.1; 297/326; 297/331; 297/336
[58] Field of Search ............................... 296/65.1, 68.1, 296/19; 297/325, 326, 331, 344.1, 336

[56] References Cited

U.S. PATENT DOCUMENTS

| | | | |
|---|---|---|---|
| 3,328,069 | 6/1967 | Dumas | 296/65.1 |
| 3,731,972 | 5/1973 | McConnell . | |
| 4,025,108 | 5/1977 | Leighty . | |
| 4,319,653 | 3/1982 | Carlson . | |
| 4,415,197 | 11/1983 | Meyer . | |
| 4,565,407 | 1/1986 | Brautigam . | |
| 4,696,508 | 9/1987 | Brautigam . | |
| 4,930,593 | 6/1990 | Swartzendruber et al. . | |
| 5,012,880 | 5/1991 | Abner . | |
| 5,048,154 | 9/1991 | Swartzendruber . | |
| 5,136,752 | 8/1992 | Bening et al. . | |
| 5,230,544 | 7/1993 | Morritt et al. | 296/65.1 |

OTHER PUBLICATIONS

One page having copies of four photos of a prop rod for a Deere Model 9500 Combine, photos taken by a Deere & Co. employee, illustrating prop rod that was available prior to the invention of the subject application.

Deere & Company, 1993 John Deere Combine Selection Guide for Maximizer 9400, 9500, 9600, Sidehill, CTS Rice Combines, 24 pages, published in the U.S.A. in 1993. See p. 19 for door held open by prop rod shown in above photos.

Golf Course Management–Magazine Oct. 1993, Customizing the Utility Vehicle, pp. 24 and 26, published in the U.S.A. in Oct. 1993.

E–Z–Go, Division of Textron, E–Z–Go Industrial, 14 pages (see particulary p. 13), published in the U.S.A. in 1988.

Taylor–Dunn, Taylor–Dunn Industrial Trucks Tough and Dependable, see particularly p. 19 of the 24 page brochure, published in the U.S.A. in 1990.

Deere & Company, Parts Catalog for John Deere F911 Front Mower Seat Based Pads and Latch, pp. 80–12, published in the U.S.A. on 24 Nov. 1992.

Deere & Company, Parts Catalog for John Deere Model 1800 Utility Vehicle, Seat and Seat Base, pp. 90–4 and 90–5, published in the U.S.A. on 4 May 1993.

Deere & Company, Parts Catalog for John Deere Model F510 and F525 Front Mowers, pp. 60–4, 6, and 6A, published in the U.S.A. on 20 Aug. 1993.

Primary Examiner—David M. Mitchell
Assistant Examiner—Kia M. Robinson

[57] ABSTRACT

A prop and latch rod mechanism is provided for use with a passenger seat carried forwardly of the cargo deck on a utility vehicle. The mechanism is particularly useful for securing a pivotable seat in a forwardly tilted transport position so that the cargo deck storage space can be enlarged. The preferred embodiment utilizes the mechanism with a vehicle adapted for emergency medical usage and permits the utility deck to be extended to accommodate a stretcher. The mechanism is comprised of a wire rod pivotally coupled at one end with the seat, having a track or channel that permits quick and easy movement of the seat between its operative and forwardly pivoted transport position and includes a latch structure that is releasably engageable with a latch rod carried on the vehicle.

14 Claims, 3 Drawing Sheets

PROP AND LATCH ROD FOR A VEHICLE SEAT

BACKGROUND OF THE INVENTION

1) Field of Invention

The present invention relates generally to seats for vehicles which have cargo decks behind them, and more specifically to a structure for releasably securing such a vehicle seat in the forwardly tilted position to increase the cargo deck storage space available behind the seat.

2) Related Art

It is well known that utility vehicles such as Deere's "Gator" are adapted to be used in off-road conditions. It is also well known that such vehicles have been modified for use in providing emergency medical treatment and transport.

When so modified, these vehicles are provided with an operator's seat and cargo bed or deck adapted to carry medical supplies, and/or emergency medical equipment. Further, the deck has been adapted to transport injured and/or sick individuals from an off-road side to an ambulance or medical treatment vehicle facility such as a hospital.

To provide aid to injured or sick with the use of such a vehicle, it is often desirable that more than one emergency assistance individual ride with the utility vehicle. While some utility vehicles have been equipped with second and sometimes third seats, it would be desirable to provide two of the seats forward of the cargo deck. However, providing a second seat forward of the cargo deck restricts the fore-and-aft deck space available for transporting stretchers as well as the space available for other related uses of the deck.

BRIEF SUMMARY OF THE INVENTION

Accordingly, it is an object to provide a utility vehicle adapted for use as an emergency medical treatment vehicle whereby the vehicle is provided with two seats forward of the cargo deck to permit carrying two individuals to assist in administering aid.

Further, it would be desirable that one of the seats, that is the one not utilized for operating the vehicle, be shiftable in order to provide an expansion to the cargo storage or deck area available for carrying stretchers and/or related medical equipment.

To this end, there is provided a seat that is shiftable between a operative position for carrying an individual and a forwardly tilted position to expand the space available on the deck for emergency medical uses. Specifically, an improved prop rod and latch structure is provided for permitting swinging movement of the seat between a first operative position and a second forwardly tilted position and for securing the seat in its forwardly tilted position to prevent movement of the seat into the storage area during transport operations.

BRIEF DESCRIPTION OF THE ART

BRIEF DESCRIPTION OF THE PREFERRED EMBODIMENT

Figure 1:
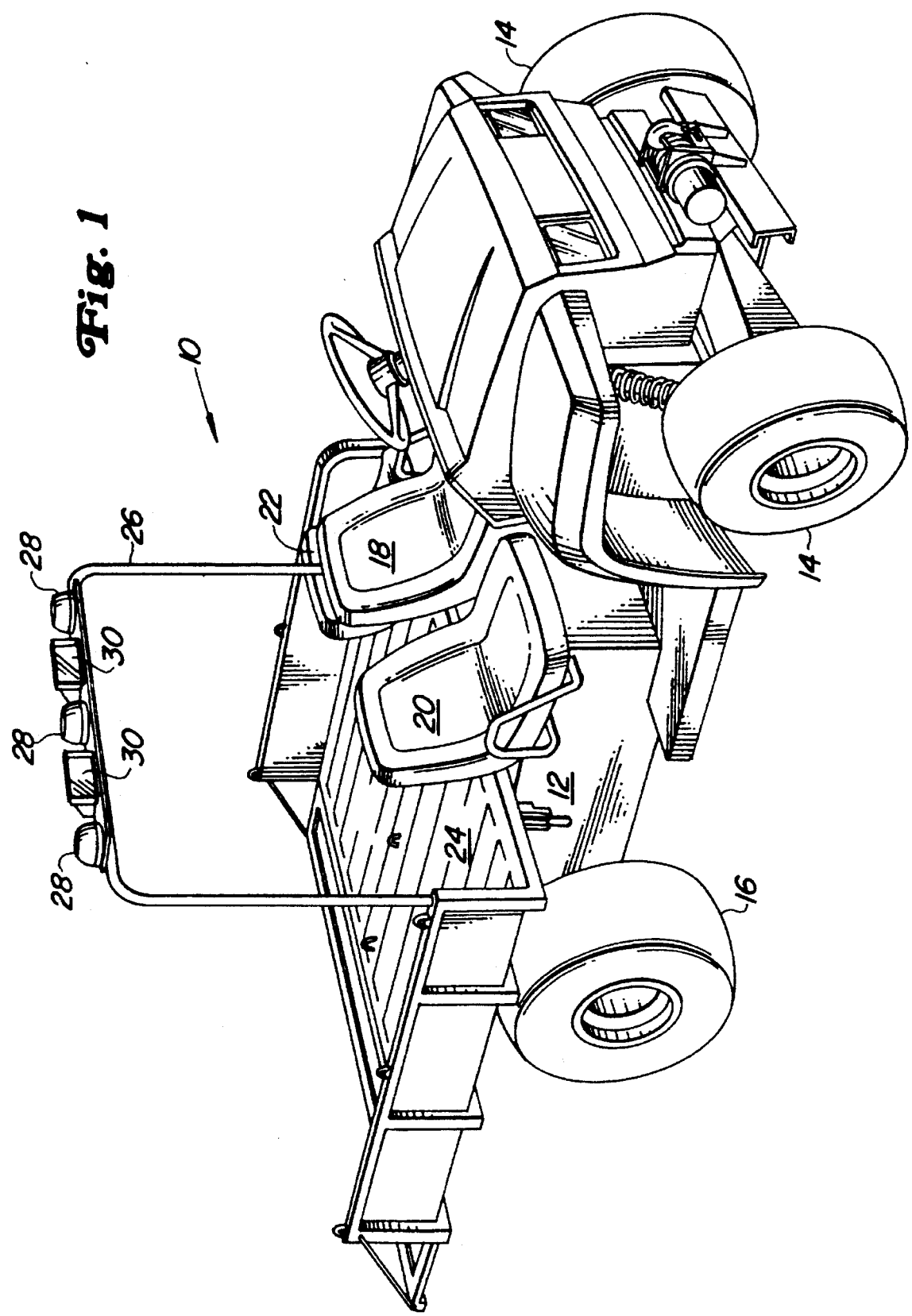
FIG. 1 is a left front elevational view of a utility vehicle equipped to serve as a emergency medical transport vehicle, the vehicle including a seat equipped with the present invention.

Looking now to FIG. 1, there is illustrated in elevational front perspective, a utility vehicle equipped with the present invention.

The utility vehicle 10 includes a frame or support structure 12 carried by steerable front wheels 14 and driven by rear wheels 16. An operator's seat 18, as well as a passenger seat 20, are carried on the support 12. To the rear and side of the the operator's seat 18 is provided an attendant's seat 22. The utility vehicle 10 is equipped with a cargo deck or bed 24 rearwardly spaced of the front seats 18 and 20, that bed 24 being adapted for medical emergency or ambulance type usage. Extending above the deck 24 is a tubular frame structure 26 adapted to carry emergency flashing lights 28 as well as supplementary illumination lights 30. The frame structure 26 is also adapted to support medical assistance supplies such as intraveineous injection bags.

Figure 2:
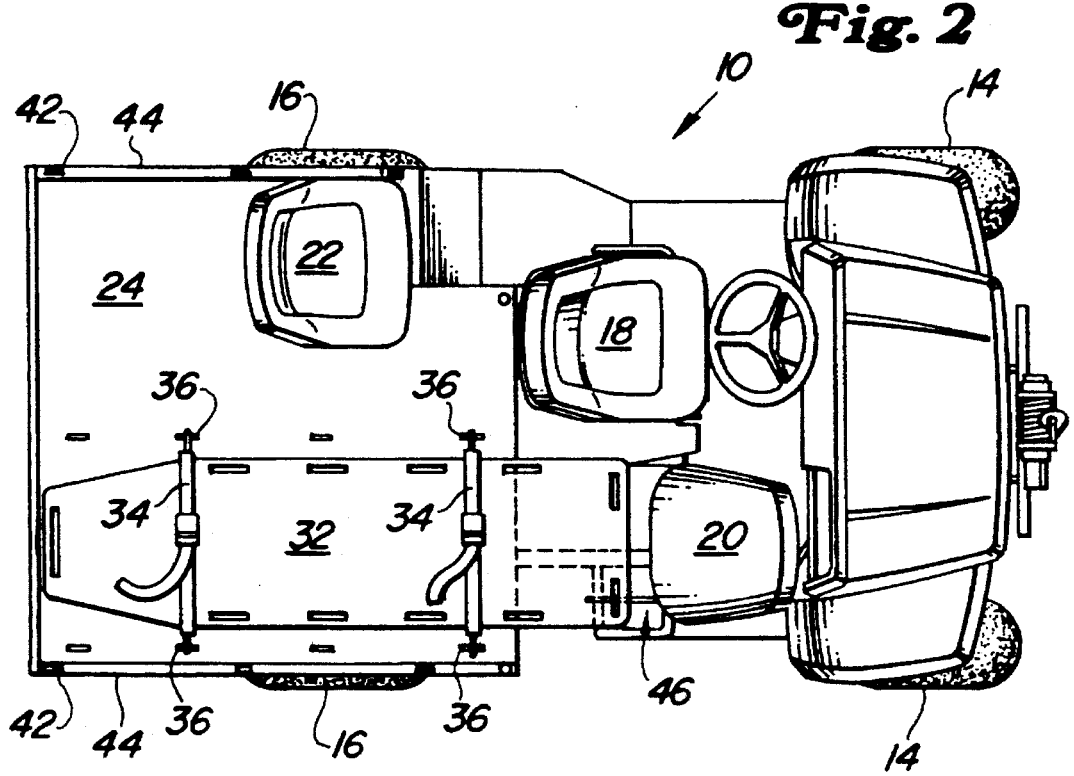
FIG. 2 is a plan view of the vehicle illustrated in FIG. 1, equipped to transport a single stretcher unit and illustrating the passenger seat in a forwardly tilted position.
Figure 3:
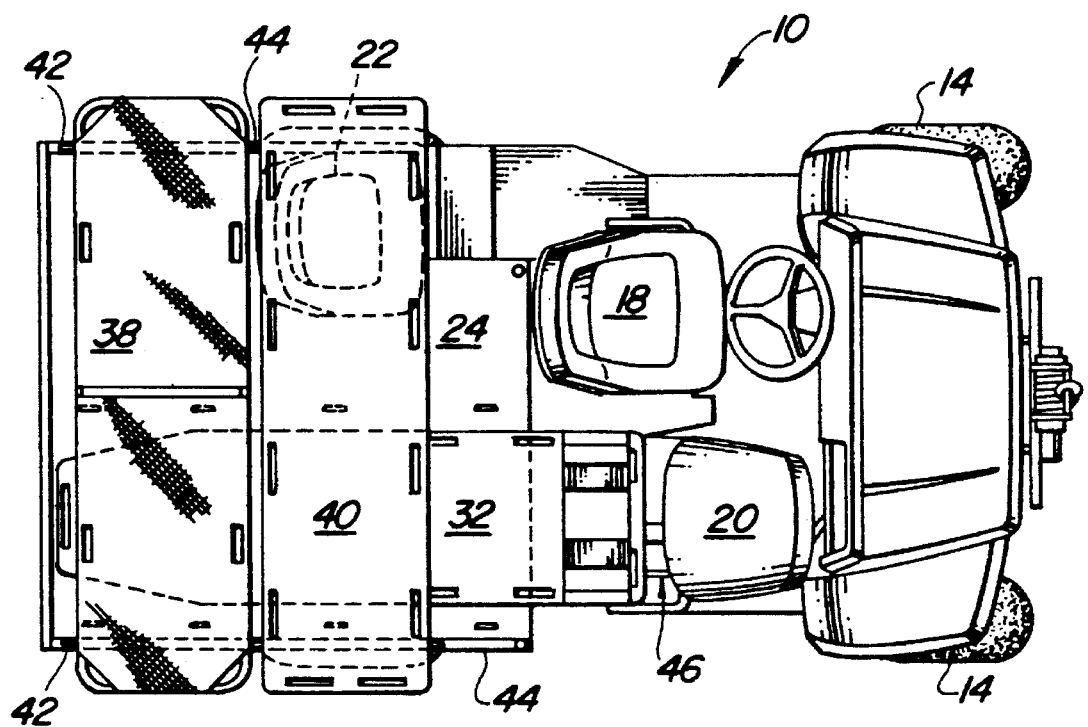
FIG. 3 is a plan view similar to FIG. 2 but illustrating the vehicle outfitted with three stretcher units and the passenger seat in the forwardly tilted position.

FIGS. 2 and 3 illustrate plan views of the utility vehicle 10. FIG. 2 illustrates a stretcher 32 positioned fore-and-aft on the cargo deck 24. The stetcher 32 is secured to the deck 24 by straps 34 held in place by brackets 36 provided on the cargo deck 24. To accommodate the length of the stretcher 32, the passenger seat 20 has been swung forwardly as shown in both FIGS. 2 and 3.

As shown in FIG. 3, the cargo deck 24 can be adapted to accommodate three stretchers 32, 38 and 40, if necessary, with brackets 42 also being provided on the upstanding deck walls 44 to assist in securing the top two stretchers 38 and 40 in place above the fore-and-aft extending third stetcher 32.

Figure 4:
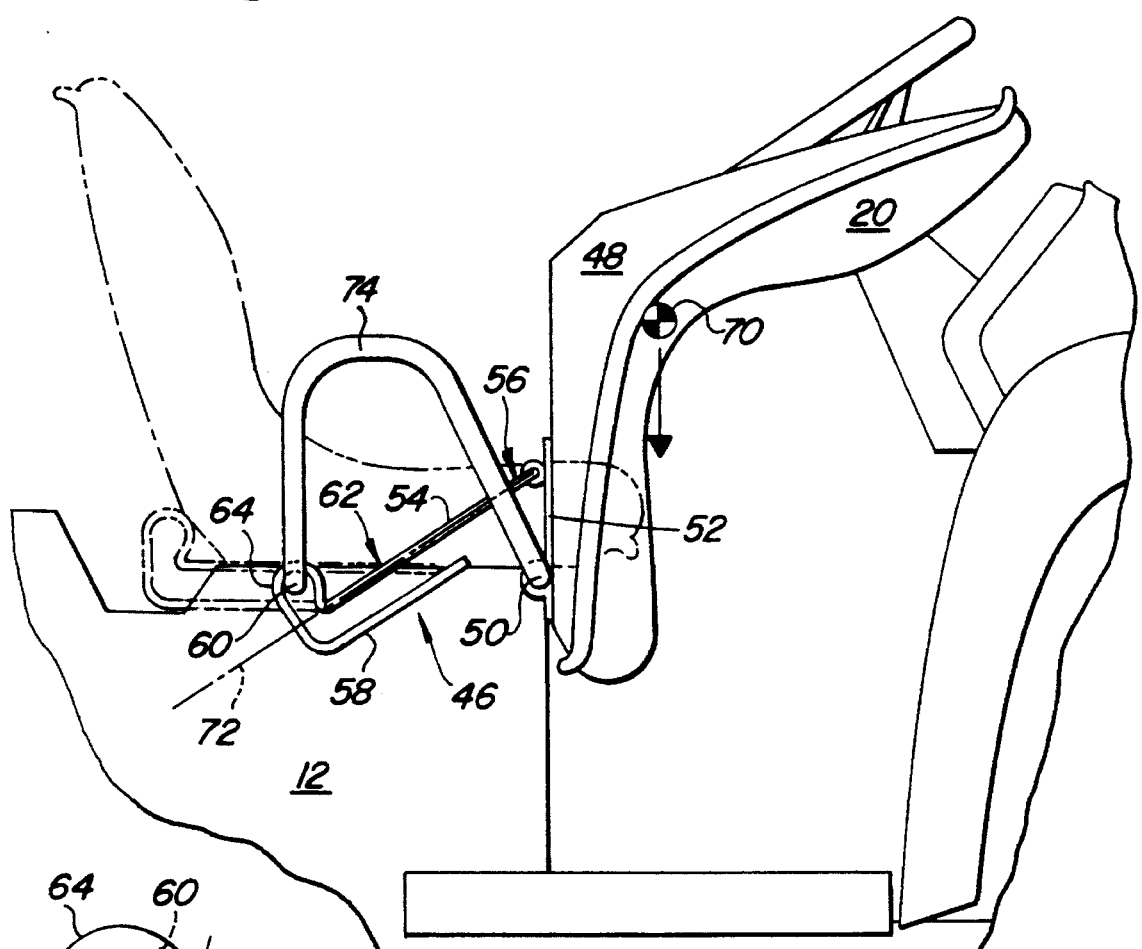
FIG. 4 is a schematic side view of the passenger seat tilted into a forwardly position with the latch and prop rod securing the seat in its forwardly position.
Figure 6:
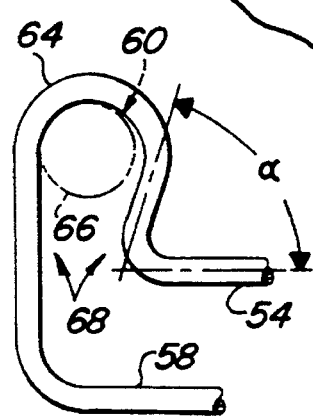
FIG. 6 is a side schematic view of the latch rod and prop mechanism latching structures.
Figure 5:
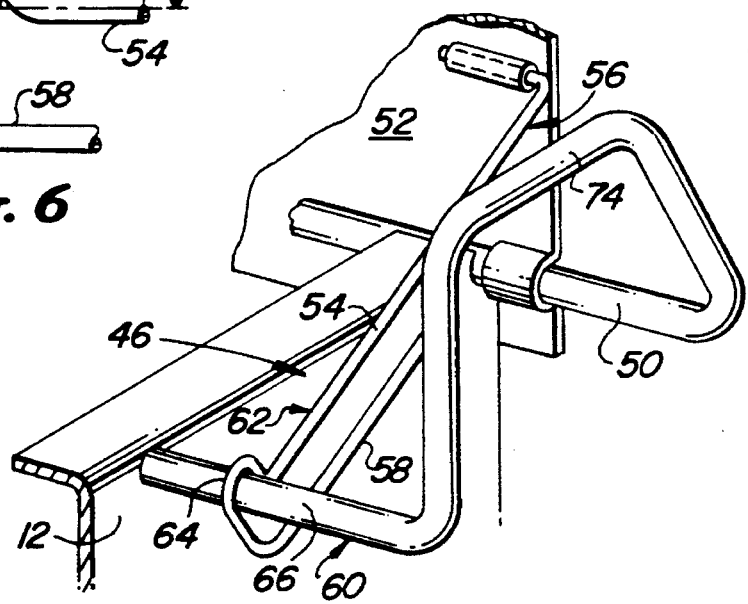
FIG. 5 is a close-up, partial perspective view of the latch rod and prop mechanism.

In FIGS. 4, 5, and 6, there is illustrated in better detail the latch and prop mechanism 46. Specifically, FIG. 4 illustrates in solid lines the passenger seat 20 tilted forwardly into its non-use position with the latch and prop rod 46 securing it in place. The seat's base or pan 48 is pivotally mounted for swinging movement on a laterally extending rod or pivot structure 50 for movement between the position illustrated in FIG. 1 and the transport position illustrated in solid lines in FIG. 4. Attached to a bracket 52 which is mounted on the base 48 of the seat 20 is the latch and prop rod 46. The rod 46 includes an elongated prop structure 54 which has one end portion 56 pivotally secured to the seat base pan 48 at a point vertically spaced above the swinging seat pivot 50.

The latch and prop rod 46 in the preferred embodiment is a one piece wire formed rod that includes upper and lower members 54 and 58 that serve as a guide or track means along which the prop and latch mechanism 46 can be slidingly shifted over the horizontally and transversely extending bar or first latch member 60 carried on the support structure 12 of the vehicle 10.

At the rearwardly or other end portion 62 of the elongated prop structure 54, there is provided a second latch member 64 in the form of a curved section. This member 64 is adapted to be yieldably received on the arm or neck portion 66 of the first latch member 60. The second latch member 64 includes a throat or jaw 68 that is preferably designed to partially encircle the arm or neck portion 66 when engaged by an amount in excess of 180 degrees. Consequently, its forward juncture with the elongated prop structure or upper rod member 54 forms an acute angle. The throat portion 68 of the yieldable portion 64 in the preferred embodiment is slightly larger than the neck 66 to permit easy engagement between the first and second latch members 60 and 64. However, as shown in FIG. 6, that throat 68 could be slightly smaller in cross section than the arm or neck portion 66 about which it is removably received to better assure that the latch members 60–64 remain engaged once they have been engaged.

In operation, the passenger seat 20 occupies the operative position as illustrated in FIG. 1 to accommodate the passenger on the utility vehicle 10. When a cargo, such as a stretcher 32, is to be carried on the deck 24 of the vehicle 10 and it is desired to expand the deck space, the passenger seat 20 can be swung forwardly to the position shown by the solid lines in FIG. 4. The seat 20 can be secured in that position by engagement of the first and second latch members 60 and 64 to prevent its backward tilting during transport.

When the operator or passenger wants to move the seat 20 from its rearwardly to its forwardly position, he simply lifts the rear of the seat 20 to swing it forwardly about its laterally extending mounting or pivot structure 50. As the seat 20 is moved, the generally parallel top and bottom rod surfaces 54 and 58 or track means will slidably be guided along the arm or neck portion 66 of the first latch member 60 until the end of the prop structure 46 is reached. At this point, the seat 20 would be in the orientation illustrated by the solid lines in FIG. 4. To secure the seat 20 in this position, the latch and prop rod 46 would be pushed downwardly to engage the first and second latch members 60 and 64. Since the yieldable portion of the second latch member 64 includes an opening or throat 68 which is larger in cross section than the arm or neck portion 66 of the first latch member 60, the operator will not have to exert pressure to engage or disengage the first and second latch members 60 and 64 (see FIG. 6). If the throat 68 is made with a smaller cross-section, then once the members 60 and 64 have been engaged, the narrower opening will resist disengagement and serve to better secure the latch members 60–64 together and maintain the seat 20 in its forwardly tilted position.

In this position the center of gravity 70 of the seat 20 will be forwardly of the pivot structure 50. Accordingly, the weight of the seat 20 will tend to urge the seat forwardly about the pivot structure 50 (as viewed in FIG. 4) and the over-center condition of the prop and latch rod 46 will maintain it in its forward position during the transport operation. Further, as illustrated by the line 72 through the elongated prop structure 54 shown in FIG. 4, the force acting through the elongated rod 54, should the seat 20 tend to be bounced rearwardly about the pivot structure 50 during transport, will pass below the arm or neck portion 66 of the first latch member 60, thereby tending to maintain the first and second latch members 60 and 64 in engagement rather than urge the second latch member 64 toward disengagement with the arm 66.

In the preferred embodiment the first latch member 60 is provided through utilizing a tubular member that includes the horizontally extending arm 66 coupled with a hip restraint and handhold 74 provided adjacent the passenger's seat. This tubular member not only includes the handhold and hip restraint 74, but also with the pivot structure or swingable mounting means 50 about which the seat 20 is secured with the vehicle 10.

With the present invention, there is provided a prop and latch rod means, which is simple in design and operation, is inexpensive and easy to manufacture and which can positively secure the seat 20 in its transport position to provide additional deck space. This prop and latch rod structure can be easily disengaged by moving the seat rearwardly to eliminate the gravitational force urging the seat forwardly. As a result of the unique form of the latch and prop rod, and the over-center operation of the rod, it serves to retain the first and second latch members in engagement when the seat is in its transport position.

I claim:

1. A seat prop and latch means useable with a seat which is swingably mounted on means carried by a support, the seat being moveable between a first position adjacent the support and a second position swingably separated from the support, the prop and latch means comprising a first latch member carried by the support and spaced from the means which swingably mounts the seat with the support; an elongated prop rod structure having one end portion swingably coupled with a portion of the seat, which portion is spaced from the means that swingably mounts the seat with the support, said structure further including guide track that is slidingly engagable with the first latch member as the seat is moved between its first and second positions, and a second latch member carried at the other end portion of the prop rod structure, the second latch member including a yieldable portion adapted for releasable engagement with the first latch member when the seat is in its second position.

2. The invention defined in claim 1 wherein the seat is carried on a vehicle having a cargo carrying deck rearwardly of the seat which is enlarged when the seat is moved into its second position.

3. The invention defined in claim 2 wherein the cargo carrying deck is adapted to carry a stretcher that extends into an area made available when the seat is moved from its first position to its second position.

4. The invention defined in claim 3 wherein the seat is swung forwardly when it is in its second position, the center of gravity in the seat is forwardly of the means which swingably mounts the seat on the support, and the first and second latch members when engaged, serve to resist rearwardly movement of the seat to its first position.

5. The invention defined in claim 1 wherein the means swingably mounting the seat and the second latch member are horizontally spaced apart with the prop structure being swingably coupled with the seat in a location vertically spaced from the means which swingably mounts the seat on the support.

6. The invention defined in claim 5 wherein the center of gravity of the seat when it is in its second position is horizontally spaced further from the second latch means than it is horizontally spaced from the means mounting the seat on the support.

7. Seat latch and prop means usable with a seat having means swingably mounting it on a support for movement between a first position with the seat adjacent the support, and a second position having the major portion of the seat moved away from the support, the latch and prop means comprising a first latch member carried by the support, said member including an arm; a prop rod structure swingably coupled to a portion of the seat which is spaced from the means which swingably mounts the seat on the support; and a second latch member carried by the prop rod structure including a yieldable rod portion adapted to encircle the arm to an extent greater than 180° when it is releasably engaged, the yieldable portion being spaced from the means which swingably couples the rod structure to the seat, the first and second latch members serving to secure the seat in its second position when the yieldable portion of the second latch member is engaged with arm.

8. A seat prop and latch means useable with a vehicle having a support and seat, the seat being swingably mounted on a pivot structure carried by the support, the seat further being moveable between a first position adjacent the support and a second position swingably separated from the support, the prop and latch means comprising a first latch member carried by the support and spaced from the pivot structure, said member including a neck portion; an elongated prop rod structure having one end portion swingably coupled with the seat and vertically spaced above the pivot structure; a second latch member carried at the other end portion of the prop rod structure, the second latch member including an opening which is yieldably receivable on the neck portion of the first latch member when the seat is in its second position, and a hand hold structure coupled with the neck portion of the first latch member.

9. A seat prop and latch means useable with a seat which is swingably mounted on means carried by a support, the seat being moveable between a first position adjacent the support and a second position swingably separated from the support, the prop and latch means comprising a first latch member carried by the support and including a neck portion, said first latch member being spaced from the means which swingably mounts the seat with the support; an elongated prop rod structure having one end portion swingably coupled with a portion of the seat, which portion is spaced from the means that swingably mounts the seat with the support, said structure further including a guide track that is slidingly engagable with the first latch member as the seat is moved between its first and second positions, and a second latch member carried at the other end portion of the prop rod structure, the second latch member including an opening adapted for yieldably sliding over the neck portion when the seat is moved into its second position.

10. A seat prop and latch means useable with a vehicle having a support and seat, the seat being swingably mounted on a pivot structure carried by the support, the seat further being moveable between a first position adjacent the support and a second position swingably separated from the support, the prop and latch means comprising a first latch member carried by the support and spaced from the pivot structure, said member including a neck portion; an elongated prop rod structure having one end portion swingably coupled with the seat and vertically spaced above the pivot structure; a second latch member carried at the other end portion of the prop rod structure, the second latch member including an opening which is yieldably receivable on the neck portion of the first latch member when the seat is in its second position, and a hand hold structure coupled with the neck portion of the first latch member, said hand hold structure being coupled with a hip restraint carried adjacent the seat.

11. The invention defined in claim 10 wherein the center of gravity of the seat when in its second position is forwardly spaced of the means which swingably mounts the seat on the support.

12. The invention defined in claim 11 wherein the seat is carried on a vehicle having a deck area adapted to receive cargo, that deck area being enlarged when the seat is moved into its second position.

13. Seat latch and prop means usable with a seat having means swingably mounting it on a support for movement between a first position with the seat adjacent the support, and a second position having the major portion of the seat moved away from the support, the latch and prop means comprising a first latch member carried by the support, said member including an arm; a prop rod structure swingably coupled to a portion of the seat which is spaced from the means which swingably mounts the seat on the support; and a second latch member carried by the prop rod structure including a yieldable jaw in the form of a rod which is adapted to slidably engage and disengage the arm and encircle the arm to an extent greater than 180° when it is engaged, the yieldable portion being spaced from the means which swingably couples the rod structure to the seat, the first and second latch members serving to secure the seat in its second position when the yieldable portion of the second latch member is engaged with the arm.

14. The invention defined in claim 13 wherein the prop rod structure is elongated and includes a guide adapted to slidably move along the first latch member as the seat is moved between its first and second positions.

* * * * *

UNITED STATES PATENT AND TRADEMARK OFFICE
CERTIFICATE OF CORRECTION

PATENT NO. : 5,516,180
DATED : May 14, 1996
INVENTOR(S) : Jimmy N. Eavenson, Sr. et al.

It is certified that error appears in the above-indentified patent and that said Letters Patent is hereby corrected as shown below:

Column 4, line 26, before "guide" insert --a--.

Column 6, line 16, delete "means" and insert --pivot structure--.

Signed and Sealed this

Thirteenth Day of May, 1997

Attest:

BRUCE LEHMAN

Attesting Officer     Commissioner of Patents and Trademarks